United States Patent
Kishida

(10) Patent No.: US 10,207,545 B2
(45) Date of Patent: Feb. 19, 2019

(54) PNEUMATIC TIRE

(71) Applicant: SUMITOMO RUBBER INDUSTRIES, LTD., Kobe-shi, Hyogo (JP)

(72) Inventor: Masahiro Kishida, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 91 days.

(21) Appl. No.: 14/908,943

(22) PCT Filed: Jul. 23, 2014

(86) PCT No.: PCT/JP2014/069456
§ 371 (c)(1),
(2) Date: Jan. 29, 2016

(87) PCT Pub. No.: WO2015/025670
PCT Pub. Date: Feb. 26, 2015

(65) Prior Publication Data
US 2016/0159163 A1    Jun. 9, 2016

(30) Foreign Application Priority Data

Aug. 21, 2013   (JP) .................................. 2013-171587

(51) Int. Cl.
*B60C 11/13* (2006.01)
*B60C 11/04* (2006.01)
(Continued)

(52) U.S. Cl.
CPC ...... *B60C 11/1353* (2013.01); *B60C 11/0327* (2013.01); *B60C 11/042* (2013.01);
(Continued)

(58) Field of Classification Search
CPC ............. B60C 11/1353; B60C 11/0327; B60C 11/042; B60C 11/047; B60C 11/125;
(Continued)

(56) References Cited

U.S. PATENT DOCUMENTS 6,220,321 B1    4/2001  Yoshioka et al.

FOREIGN PATENT DOCUMENTS

CN          101157325 A     4/2008
EP        2 610 080 A1      7/2013
(Continued)

OTHER PUBLICATIONS

Hirai, JP 09 150609A, Machine Translation.*
(Continued)

*Primary Examiner* — Matthew J Daniels
*Assistant Examiner* — Yunju Kim
(74) *Attorney, Agent, or Firm* — Birch, Stewart, Kolasch & Birch, LLP

(57) ABSTRACT

A pneumatic tire has a main groove (3) provided to a tread part (2). A groove bottom (12) includes a protrusion portion (13) that is convex outward in a tire radial direction. The protrusion portion (13) continues along the main groove (3). The width (W3) of the protrusion portion (13) in a direction perpendicular to a groove center line (G1) of the main groove (3) is 50% to 100% of the groove width (W1) of the main groove (3). The protrusion portion (13) juts outward in the tire radial direction from an imaginary groove bottom (12A) that connects an inner end (10i) of a first groove wall (10) and an inner end (11i) of a second groove wall (11) in a straight line, and the cross-sectional area of the protrusion portion (13) is 3% to 15% of the transverse cross-sectional area of the main groove (3).

16 Claims, 7 Drawing Sheets

(51) Int. Cl.
*B60C 11/03* (2006.01)
*B60C 11/12* (2006.01)

(52) U.S. Cl.
CPC .......... *B60C 11/047* (2013.01); *B60C 11/125* (2013.01); *B60C 2011/0334* (2013.01); *B60C 2011/0341* (2013.01); *B60C 2011/0353* (2013.01); *B60C 2011/0355* (2013.01); *B60C 2011/1361* (2013.01)

(58) Field of Classification Search
CPC ..... B60C 2011/0334; B60C 2011/0341; B60C 2011/0353; B60C 2011/0355; B60C 2011/1361
USPC .................................................. 152/209.19
See application file for complete search history.

(56) References Cited

FOREIGN PATENT DOCUMENTS

| | | | | |
|---|---|---|---|---|
| JP | 62-194908 A | 8/1987 | | |
| JP | 9-66708 A | 3/1997 | | |
| JP | 9-150609 A | 6/1997 | | |
| JP | H10250317 A | * 9/1998 | ............. | B60C 11/00 |
| JP | 11-198610 A | 7/1999 | | |
| JP | 3101555 B2 | 10/2000 | | |
| JP | 3273742 B2 | * 4/2002 | ............. | B60C 11/03 |
| JP | 2002-211210 A | 7/2002 | | |
| JP | 2005-119614 A | 5/2005 | | |
| JP | 2008-296795 A | 12/2008 | | |

OTHER PUBLICATIONS

JP3273742B2—Machine Translation (Year: 2002).*
JPH10250317A—Machine Translation (Year: 1998).*
International Search Report, issued in PCT/JP2014/069456, dated Oct. 14, 2014.
Written Opinion of the International Searching Authority, issued in PCT/JP2014/069456, dated Oct. 14, 2014.
Extended European Search Report, dated Feb. 16, 2017, for European Application No. 14837871.4.

* cited by examiner

US 10,207,545 B2

PNEUMATIC TIRE

TECHNICAL FIELD

The present invention relates to a pneumatic tire having a drainage performance and a noise performance in a balanced manner.

BACKGROUND TECHNIQUE

In order to smoothly discharge water film between a road surface and a tread surface of a tread portion toward the rear in the rotational direction of the tire, a pneumatic tire comprising a main groove continuously extending in the circumferential direction of the tire is known. In order to improve the drainage performance of the pneumatic tire, it is proposed to increase a groove volume of the main groove.

However, when increasing groove volume of the main groove, there is a tendency that rigidity of the groove bottom of the main groove decreases. Therefore, at grounding of the tire, the groove bottom of the main grooves vibrates, and it vibrates the air flowing through the main groove, thereby generating air-column resonance noise. Therefore, there is a problem that the noise performance is deteriorated. In this way, the drainage performance and the noise performance have a reciprocal relationship, and it is difficult to improve both of these performances in a balanced manner.

CITATION

Patent Literature

Patent Document 1: Japanese published unexamined application 2002-211210

SUMMARY OF THE INVENTION

Problems that the Invention is to Solve

The present invention is devised in view of circumstances as described above, as a basic to improve the shape of the groove bottom of the main groove, and it is the main object of the present invention to provide a pneumatic tire having the drainage performance and the noise performance in a balanced manner.

Means for Solving the Problems

The present invention relates to a pneumatic tire provided in a tread portion with at least one main groove extending continuously in the tire circumferential direction. The main groove, in a cross-section perpendicular to a groove center line, comprises a first groove wall extending radially inward from one of tread surfaces, a second groove wall extending radially inward from the other of the tread surfaces, and a groove bottom connecting a radially inner end of the first groove wall and a radially inner end of the second groove wall and includes a protrusion portion convexed toward the radial outside. The protrusion portion continues along the main groove, and the width perpendicular to the groove center line is in a range of from 50% to 100% of the groove width of the main groove. A cross-sectional area of the protrusion portion outwardly protruding in the tire radial direction from a virtual groove bottom connecting the inner end of the first groove wall and the inner end of the second groove wall with a straight line is in a range of from 3% to 15% of a groove cross-sectional area of the main groove.

In the pneumatic tire according to the present invention, a radially outmost top of the protrusion portion is preferably positioned on the groove center line of the main groove.

In the pneumatic tire according to the present invention, the main groove preferably extends linearly in the tire circumferential direction.

In the pneumatic tire according to the present invention, the pneumatic tire is preferably provided in the protrusion portion with a sipe extending along the groove center line of the main groove.

In the pneumatic tire according to the present invention, a depth of the sipe is preferably in a range of from 50% to 100% of a radial height from the virtual groove bottom of the protrusion portion at the position provided with the sipe.

In the pneumatic tire according to the present invention, the sipe is preferably disposed on the tire equator or on the axially inner side than the intermediate position in the width direction of the protruding portion.

Effect of the Invention

The pneumatic tire of this invention is provided in a tread portion with at least one main groove extending in the tire circumferential direction. The main groove, in a cross-section perpendicular to a groove center line, comprises a first groove wall extending radially inward from one of tread surfaces, a second groove wall extending radially inward from the other of the tread surfaces, and a groove bottom connecting a radially inner end of the first groove wall and a radially inner end of the second groove wall and including a protrusion portion convexed toward the radial outside. Such a protrusion portion increases rigidity of the groove bottom and suppresses vibration of the groove bottom. Therefore, the air column resonance noise is reduced, and the noise performance is improved.

The protrusion portion continues along the main groove, and the width perpendicular to the groove center line of the main groove is in a range of from 50% to 100% of the groove width of the main groove. As a result, the rigidity of the groove bottom of the main groove is enhanced in a wide range.

A cross-sectional area of the protrusion portion is in a range of from 3% to 15% of the groove cross-sectional area of the main groove. Such a protrusion portion improves the rigidity of the groove bottom of the main groove while suppressing the decrease of the groove volume. Therefore, the pneumatic tire of the present invention improves the drainage performance and the noise performance in a balanced manner.

EMBODIMENTS OF THE INVENTION

Hereinafter, one embodiment of the present invention will be described with reference to the drawings.

Figure 1:
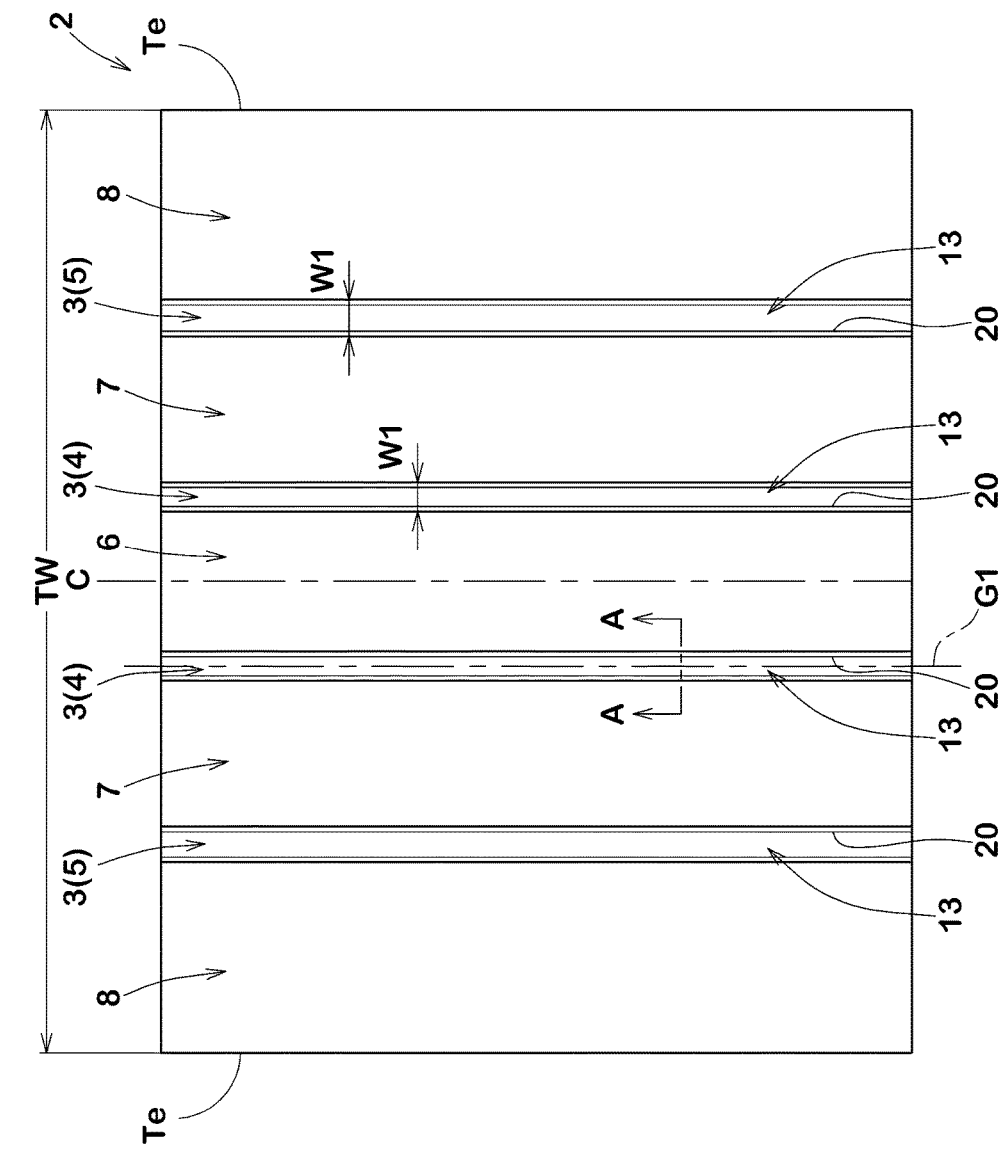
FIG. 1 is a development view of a tread portion showing an embodiment of the present invention.

FIG. 1 is a development view of a tread portion showing an embodiment of the present invention. As shown in FIG. 1, a pneumatic tire according to the present embodiment (hereinafter, simply referred to as "tire") is suitably used as a pneumatic tire for passenger cars, for example. A tread portion 2 of the tire comprises at least one main groove 3 extending continuously in the tire circumferential direction. The main groove 3 of the present embodiment includes a pair of center main grooves 4 extending on both sides of the tire equator C, and a pair of shoulder main grooves 5 extending axially outside of the center main groove 4.

The tread portion 2 of this embodiment comprises a center land portion 6 divided by a pair of the center main grooves 4, a pair of middle land portions 7 divided by the center main groove 4 and the shoulder main groove 5, and a pair of shoulder land portions 8 divided by the shoulder main groove 5 and the grounding end Te. A shape of the tread portion 2 is not limited to this embodiment, and the main grooves 3 may include a groove extending on the tire equator C, for example. Further, the each of land portions 6 to 8 may comprises a lug groove and a transverse groove and the like extending in the tire axial direction.

The "ground edge" is defined as a most axially outer grounding position when a tire under a normal load state, where the tire grounds on a plane surface at a camber angle of 0 degree with a normal load on a tire in a normal state where the tire is mounted on a normal rim. In the normal state, a tire axial distance between the grounding ends Te and Te is defined as a tread ground width TW. Unless otherwise noted, dimensions of each section of the tire are values measured in this normal state.

The "normal rim" means a rim determined for each tire by a normal including one on which the tire is based, and the normal rim is the normal rim in the case of JATMA, a "Design Rim" in the case of TRA, and a "Measuring Rim" in the case of ETRTO. The "normal internal pressure" means an air pressure determined for each tire by the normal. The "normal internal pressure" is a maximum air pressure in JATMA, a maximum value described in a table "TIRE LOAD LIMITS AT VARIOUS COLD INFLATION PRESSURES" in the case of TRA, and "INFLATION PRESSURE" in the case of ETRTO. When the tire is for a passenger vehicle, the regular internal pressure is 180 KPa.

The "normal load" is a load determined for each tire by the standard. For example, it is the maximum load ability in the case of JATMA, the maximum value described in a Table "TIRE LOAD LIMITS AT VARIOUS COLD INFLATION PRESSURES" in the case of TRA, and the "LOAD CAPACITY" in the case of ETRTO. When the tire is for a passenger vehicle, the regular load is a load equivalent to 88% of the above-mentioned load.

Both of the main grooves 4 and 5 of this embodiment extend linearly in the tired circumferential direction. These main grooves 4 and 5 discharge water smoothly in the groove posteriorly in the tire rotational direction, and the circumferential rigidity of each of the land portions 6 to 8 are improved. The main groove 3 may extend in a zigzag or wavelike fashion.

The groove width W1 of each of the main grooves 3 can be determined variously according to convention. To increase each rigidity of the land portions 6 to 8 while ensuring the drainage performance, the groove width W1 of each of the main grooves 3 is preferably in a range of from 2.0% to 8.0% of the tread ground width TW, for example.

Figure 2:
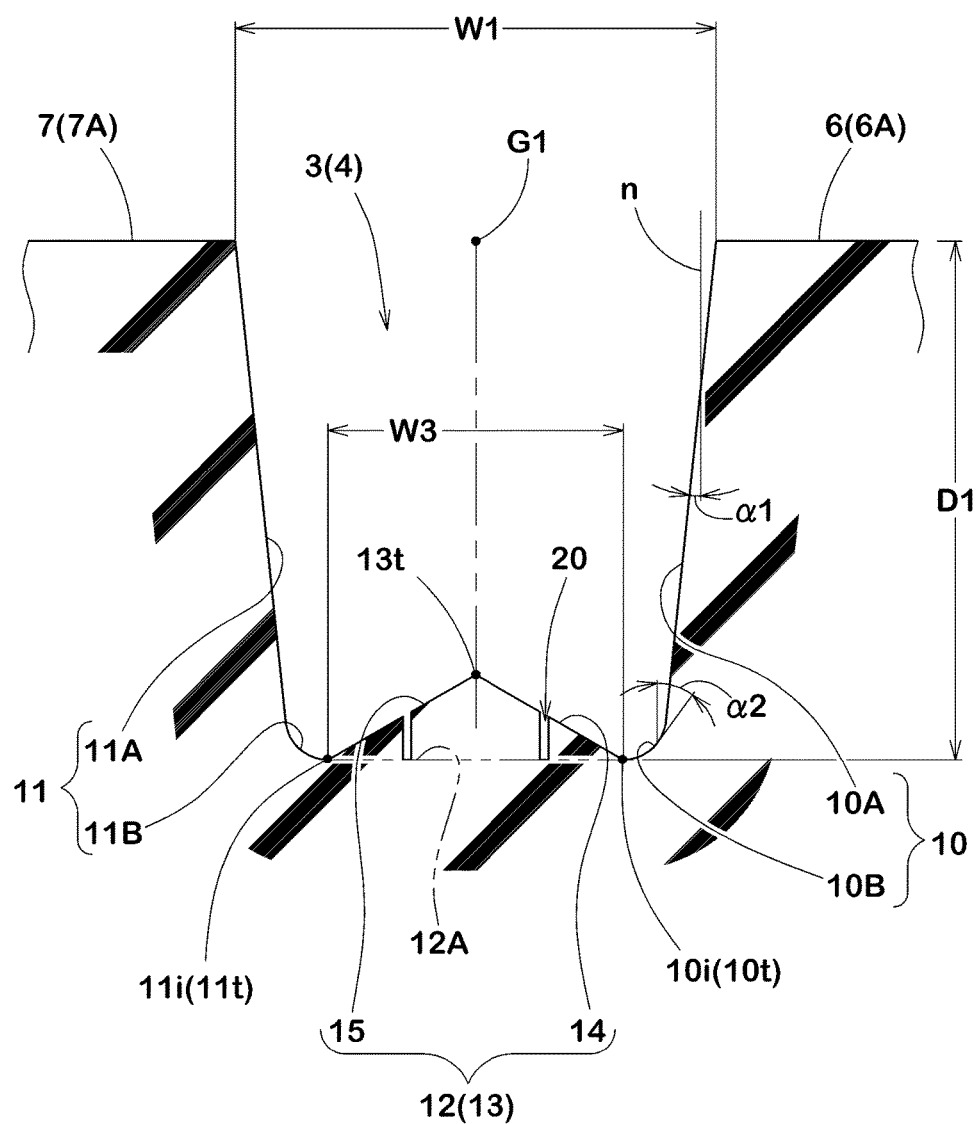
FIG. 2 is a cross-sectional view taken on line A-A of FIG. 1
Figure 3:
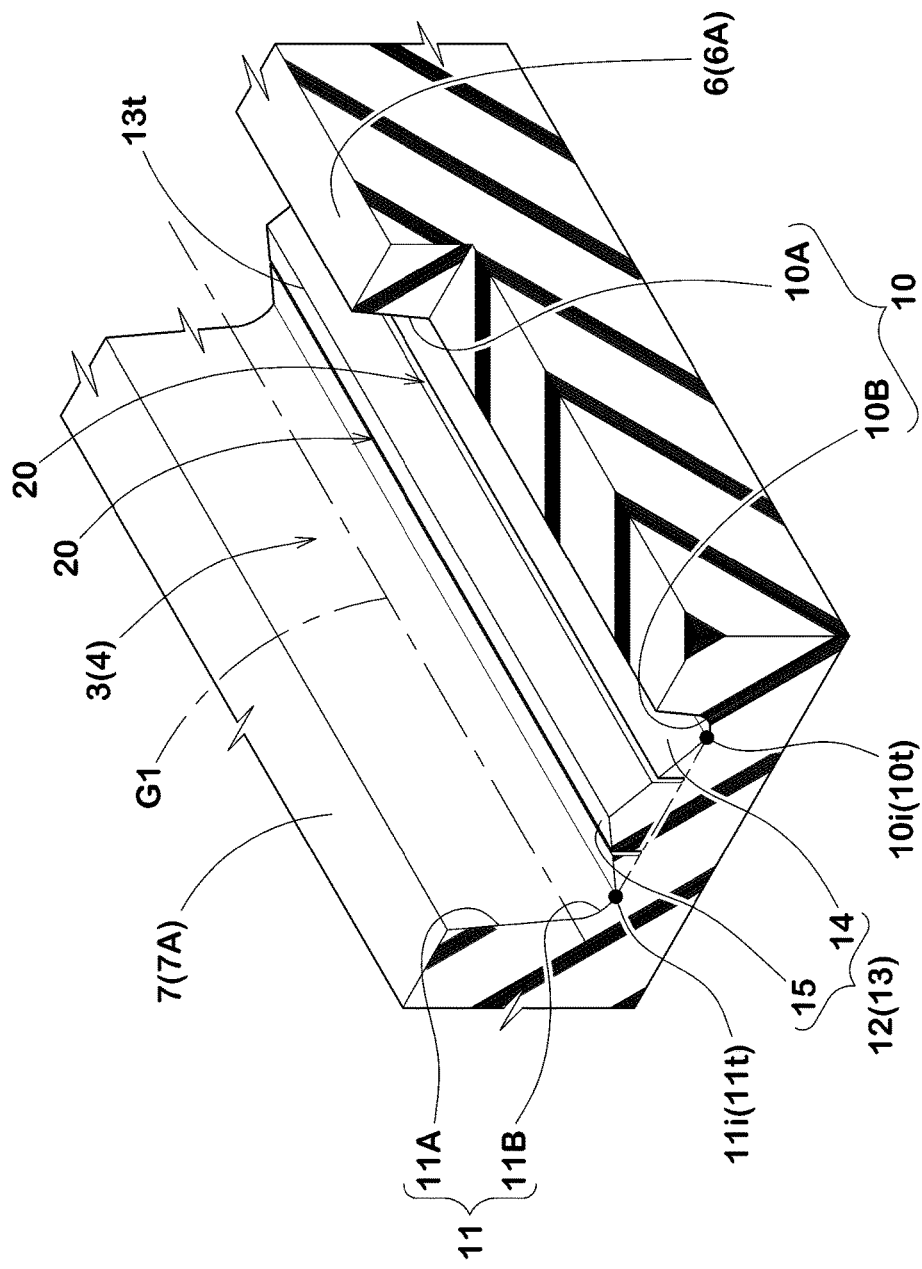
FIG. 3 is a perspective view taken on line A-A of FIG. 1.

FIG. 2 is a cross-sectional view of the center main groove 4 showing a view taken on line A-A of FIG. 1. FIG. 3 is a perspective view of FIG. 2. As shown in FIGS. 2 and 3, the center main groove 4 comprises a first groove wall 10, a second groove wall 11 and a groove bottom 12 in a cross-section perpendicular to the groove center line G1. The "groove center line", as used herein, is a line passing through the center of the groove width; and the position in the radial direction is not particularly limited.

The first groove wall 10 extends radially inward from a tread surface 6A of the center land portion 6. The first groove wall 10 of this embodiment includes a first portion 10A inclined at an angle $\alpha 1$ with respect to the normal line n of the tread surface 6A, and a second portion 10B inclined at a larger angle $\alpha 2$ than the first portion 10A and smoothly connected to the first portion 10A. In this embodiment, the inner end 10t of the second portion 10B disposed on the groove center line G1 side is the radially inner end 10i of the first groove wall 10.

The second groove wall 11 extends radially inward from a tread surface 7A of the middle land portion 7. The second groove wall 11 of this embodiment includes, as well as the first groove wall 10, a first portion 11A and a second portion 11B inclined at a larger angle than the first portion 11A. The inner end 11t of the second portion 11B disposed on the groove center line G1 side is the radially inner end 11i of the second groove wall 11.

The second portion 10B of the first groove wall and the second portion 11B of the second groove wall of this embodiment has the above-mentioned angle increasing gradually in arc-like fashion toward the groove center line G1 side. Such both of the second portions 10B and 11B greatly enhance the rigidity of the center main groove 4.

The groove bottom 12 connects between the inner end 10i of the first groove wall 10 and the inner end 11i of the second groove wall 11. The groove bottom 12 includes a protrusion portion 13 which is convex radially outward. This protrusion portion 13 enhances the rigidity of the groove bottom 12, and suppresses vibration occurring in the groove bottom 12 at the grounding of the tread portion 2. Therefore, the air column resonance noise energized by the groove bottom 12 is reduced, thereby improving the noise performance. The groove bottom 12 of this embodiment is composed of the protrusion portion 13 only, but a part thereof may be the protruding portion 13.

The protrusion portion 13, in this embodiment, has a triangular geometry comprising a first inclined portion 14 and a second inclined portion 15. The first inclined portion 14 inclines radially outward from the inner end 10i of the first groove wall 10 toward the groove center line G1 side. The second inclined portion 15 inclines radially outward from the inner end 11i of the second groove wall 11 toward the groove center line G1 side. This protrusion portion 13 can ensure a sufficient groove volume in the sides of the land portions 6 and 7 of the groove bottom 12 while effectively improving the rigidity of the center part of the groove bottom 12, where a large stress is applied. The first inclined portion 14 and the second inclined portion 15 are connected each other on the groove center line G1 in this embodiment.

The protrusion portion 13 has a width W3 perpendicular to the groove center line G1 of the center main groove 4, and the width W3 is in a range of from 50% to 100% of the groove width W1 of the center main groove 4. When the width W3 of the protrusion portion 13 is less than 50% of the groove width W1 of the center main groove 4, the vibration of the groove bottom 12 cannot be effectively suppressed. In order to ensure a depth D1 of the center main groove 4 and enhance the appearance on the wear end stage, the width W3 of the protrusion portion 13 does not exceed 100% of the width W1 of the center main groove 4. The width W3 of the protrusion portion 13 is preferably in a range of from 55% to 95% of the groove width W1 of the center main groove 4.

In the protrusion portion 13, a cross-sectional area to protrude in the radially outer side from a virtual groove bottom 12A (shown in phantom), which connects the inner end 10i of the first groove wall 10 and the inner end 11i of the second groove wall 11 with a straight line, is in a range of from 3% to 15% of a groove cross-sectional area of the center main groove 4. If the cross-sectional area of the protrusion portion 13 is less than 3% of the cross-sectional area of the center main groove 4, the volume of the protrusion portion 13 is small, and it can not increase the rigidity of the groove bottom 12. If the cross-sectional area of the protrusion portion 13 is more than 15% of the cross-sectional area of the center main groove 4, the cross-sectional area of the center main groove 4 is small, and the drainage performance is degraded. Preferably, the cross-sectional area of the protrusion portion 13 is in a range of from 5% to 13% of the cross-sectional area of the center main groove 4.

The radially outermost top 13t of the protrusion portion 13 is preferably located on the groove center line G1 of the center main groove 4. Thus, the rigidity on the groove center line G1 of the groove bottom 12 on which the largest stress acts is increased, and the vibration suppressing effect by the protruding portions 13 is effectively exhibited. Locating the top on the groove center line G1 means a mode where the normal line passes through the groove center line and the normal line with respect to a virtual tread surface obtained by filling the groove intersects with the top.

The protrusion portion 13 is continuous along the center main groove 4 of this embodiment. Therefore, the vibration suppressing effect of the groove bottom 12 is exerted continuously in the tire circumferential direction.

Figure 4:
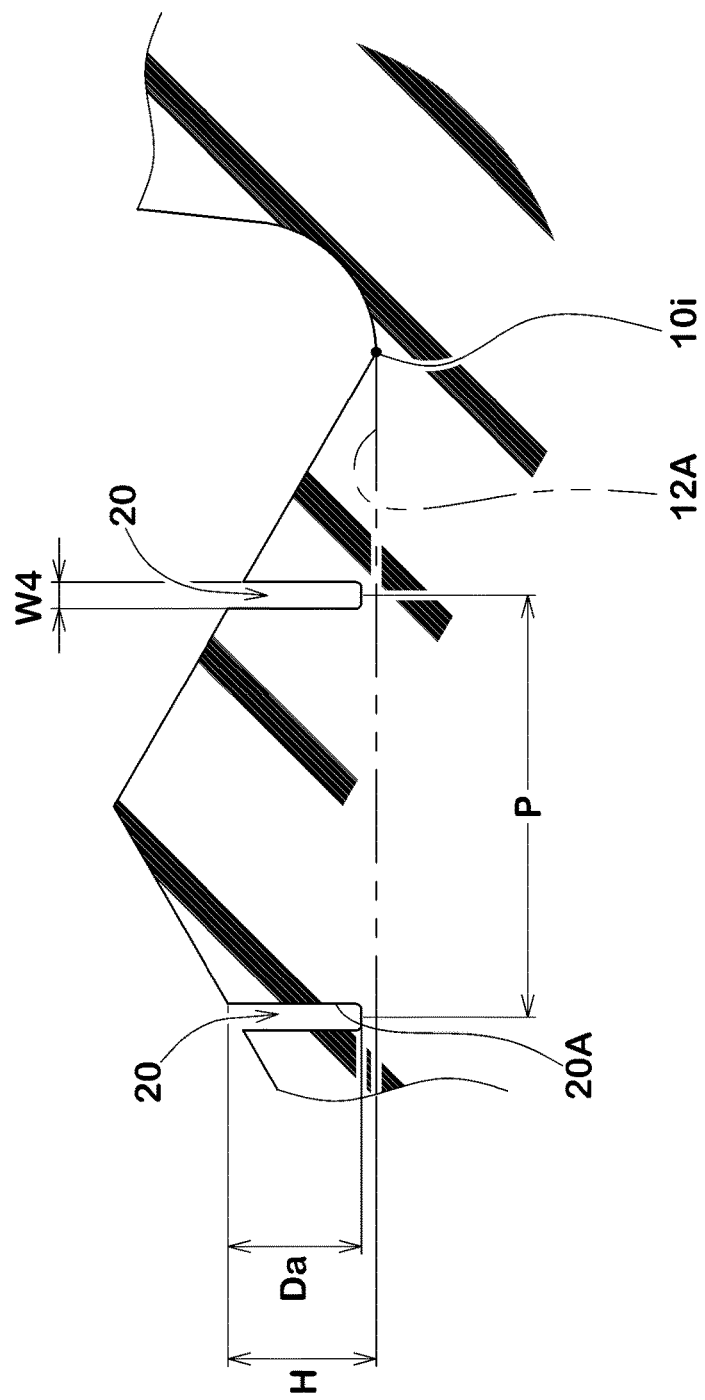
FIG. 4 is an enlarged view of a protruding portion of FIG. 2.

The protrusion portion 13 of this embodiment is provided with a sipe 20. As shown in FIG. 4, the sipe 20 is a notch having a small thickness and comprises a sipe wall 20A extending radially inward from the protrusion portion 13. Accordingly, the radial vibration causing vibration source of the air column resonance noise generated in the groove bottom 12 is attenuated by the sipe wall 20A. Therefore, the air column resonance in the center main groove 4 is further suppressed.

The sipe wall 20A of the sipe 20 of this embodiment extends linearly. This sipe 20 ensures high rigidity of the groove bottom 12. The sipe wall 20A is not limited to such embodiments, and in order to secure a large area thereof and in order to exhibit a large damping effect, for example, it may be of a zigzag or wavy.

If a depth Da of the sipe 20 is less than 50% of a radial height H of the protrusion portion 13 from the virtual groove bottom 12A at a position where the sipes 20 is provided, the vibration damping effect of the sipe wall 20A is possibly deteriorated. If the bottom of the sipe 20 is located more radially inward than the virtual groove bottom 12A, the rigidity of the groove bottom 12 is small, and there is a possibility of increasing the vibration generating in the groove bottom 12. Therefore, the depth Da of the sipe 20 is preferably in a range of from 50% to 100% of the radial height H of the protrusion portion 13 from the virtual groove bottom 12A at the position where the sipe 20 is provided, more preferably in a range of from 60% to 100%.

A width W4 of the sipe 20 is preferably in a range of from 0.6 to 0.8 mm. If the width W4 of the sipe 20 is less than 0.6 mm, a width of a knife blade to form the sipe 20 is small, the knife blade is damaged at the time of tire manufacture, and it may not be possible to form the sipe 20. If the width W4 of the sipe 20 excesses 0.8 mm, the rigidity of the groove bottom 12 decreases, and there is a possibility that vibration of the groove bottom 12 increases.

As shown in FIG. 3, the sipe 20 extends along the groove center line G1 of the center main groove 4. Thus, the vibration damping effect can be exhibited continuously in the tire circumferential direction. The sipe 20 of this embodiment extends linearly, but it may extend in a wave or zigzag shape, for example.

As shown in FIG. 4, the protrusion portion 13 comprises two sipes 20 in this embodiment. Thus the vibration damping effect of the sipe wall 20A is greatly exhibited. In the case where a plurality of sipes 20 are provided in the protrusion portion 13, in order to exhibit good balance between the vibration damping effect of the sipe walls 20A and the vibration suppression effect ensuring the rigidity of the groove bottom 12, a pitch P (shown in FIG. 4) of the sipe 20 is preferably in a range of from 1.0 to 3.0 mm. Also the sipe 20 is preferably disposed at an equal pitch across the groove center line G1.

When the sipe 20 is provided singularly in the protrusion portion 13, the sipe 20 is preferably provided in an intermediate position of the width direction of the protrusion portion 13. Thus, it is possible to secure the large depth Da of the sipe thereby attenuating the vibration effectively.

When a straight-ahead running, a largest ground contact pressure acts on the tire equator C. Therefore, when the center main groove 4 extending on the tire equator C, the sipes 20 is preferably provided on the tire equator C.

Figure 5:
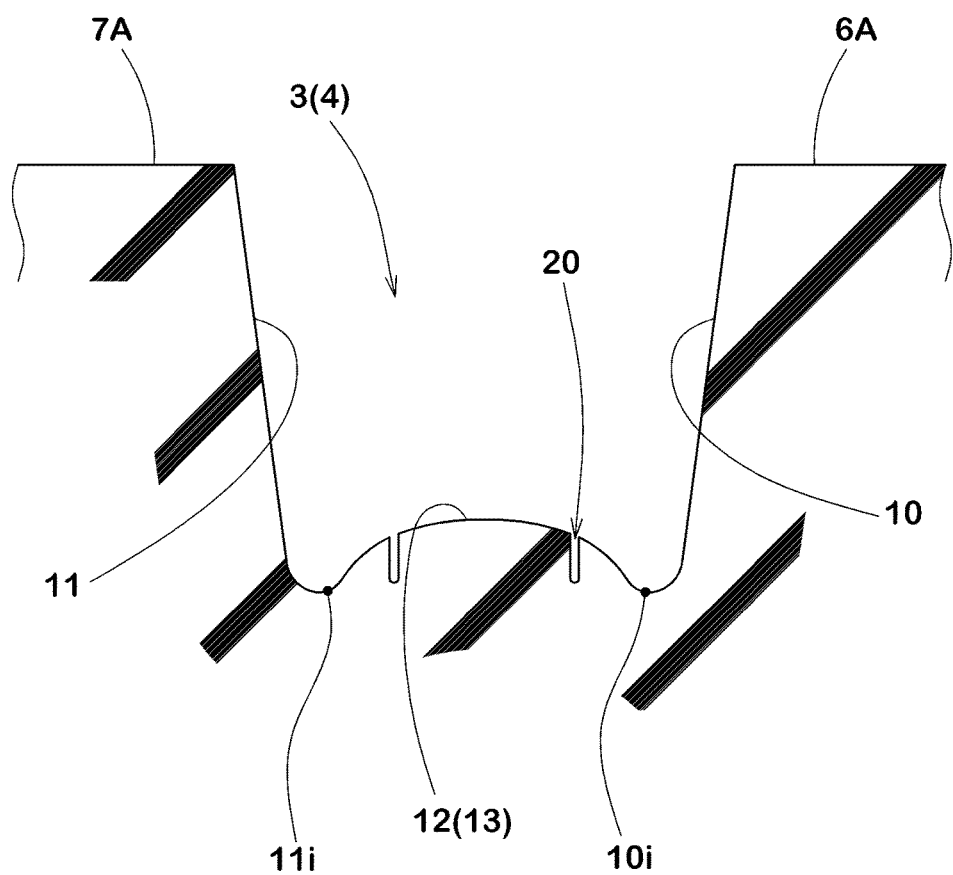
FIG. 5 is a cross-sectional view of a main groove showing another embodiment of the invention.

FIG. 5 shows a cross-sectional view of the center main groove 4 of another embodiment of the present invention. As shown in FIG. 5, the groove bottom 12 of the center main groove 4 may be a mode comprising the protrusion portion 13 having a substantially semicircular arc, which smoothly connects between the inner end 10i of the first groove wall 10 and the inner end 11i of the second groove wall 11. This protrusion portion 13 further improves the rigidity of the groove bottom 12, thereby suppressing the vibration.

Figure 6:
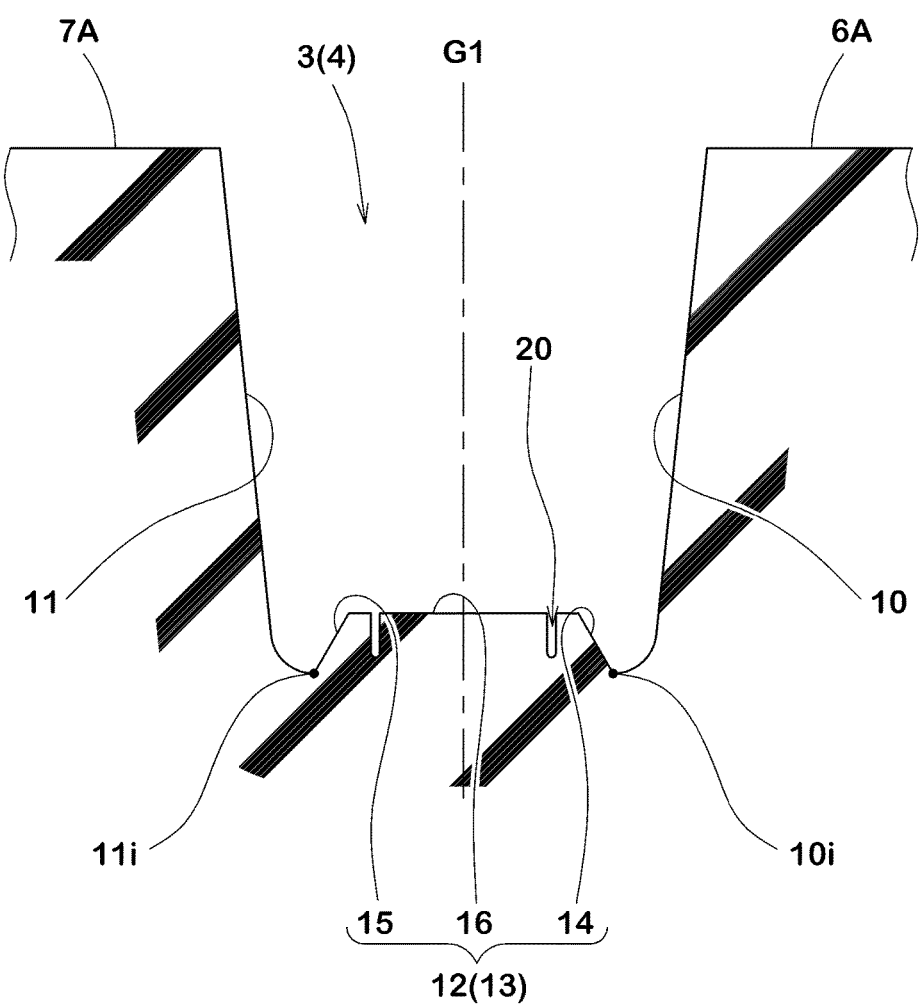
FIG. 6 is a cross-sectional view of the main groove showing still another embodiment of the present invention.

FIG. 6 shows a cross-sectional view of the center main groove 4 of still another embodiment of the present invention. As shown in FIG. 6, the groove bottom 12 of this embodiment is formed in a substantially trapezoidal shape including the first inclined portion 14, the second inclined portion 15, and a lateral portion 16. This protrusion portion 13 can substantially uniformly improve the rigidity of the groove bottom 12 along the groove width direction.

In the above-mentioned embodiment, while the center main groove 4 is provided with the protrusion portion 13 and the sipe 20, alternatively or simultaneously, as shown in FIG. 1, the protrusion portion 13 and the sipe 20 may be also formed in the groove bottom of the shoulder main groove 5.

Although the pneumatic tire of the present invention has been described in detail, the invention is implemented by changing the various aspects without being limited to the specific embodiments described above.

Example

Test pneumatic tires of size 235/45R18 having the basic pattern of FIG. 1 were made based on the specifications shown in Table 1. The drainage performance and the noise performance of each test tire were tested. Common specifications and test methods for each test tire were as follows:
Tread ground width TW: 190 mm
Groove depth of center main groove: 8.2 mm
Groove width of center main groove/tread ground width: 6.8%

Groove depth of shoulder main groove: 8.2 mm

Groove width of shoulder main groove/tread ground width: 3.7%

Width of Sipe: 0.8 mm

<Noise Performance (Coasting-Passing Noise of Actual Vehicle)>

Figure 7:
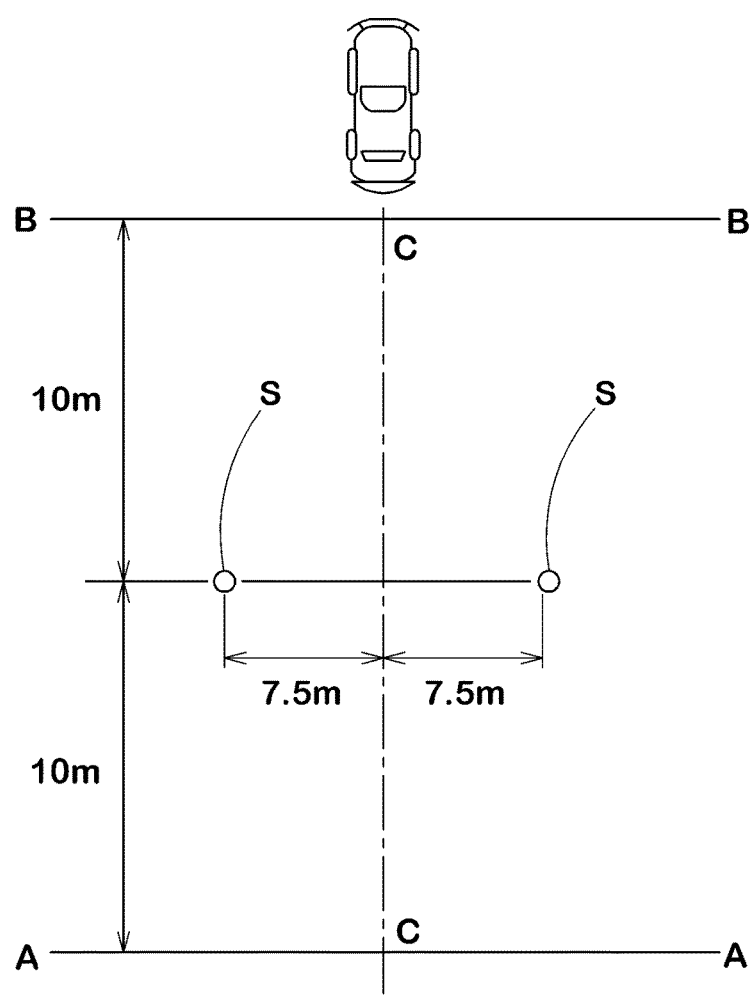
FIG. 7 is a plan view illustrating the outline of a noise test using an actual vehicle traveling.

The respective test tires, under the following conditions, were attached to all wheels of a passenger car emissions 2000 cc. As shown in FIG. 7, this test vehicle was coasted by a test driver, in accordance with international standards (ECE R117) regarding a single tire noise regulations, between A-B in a state of the engine stopped and the gear neutral. The maximum noise level at the time of coasting was measured. A noise measurement tool S is attached to the position of the vehicle on both sides 7.5±0.05 meters apart from the travel center C-C of the vehicle and 1.2±0.02 meters from the ground. The results were evaluated by a difference from the noise level of Conventional Example 1 (dB (A)). The larger the numerical value, the noise performance is better.

Rim: 8.0 J×18

Internal pressure: 176 kPa (average)

Load: 4.60 kN (average)

Speed of between A-B: from 70 to 90 km/h

<Drainage Performance>

The test driver derived the test vehicle into a 20 meter-long and 10 millimeter-deep puddle provided on the test course of the asphalt road surface with a radius of 100 meter at a speed of 80 km/h. An average lateral acceleration (lateral G) acting on a front wheel was calculated. The results were displayed using indices with Conventional Example 1 being 100. The larger the numerical value, the drainage performance is better.

The test result is shown in Table 1.

TABLE 1

|  | Conventional Ex. 1 | Conventional Ex. 2 | Ex. 1 | Comparative Ex. 1 | Ex. 2 | Ex. 3 | Ex. 4 | Ex. 5 | Ex. 6 | Comparative Ex. 2 |
|---|---|---|---|---|---|---|---|---|---|---|
| Ratio W3/W1 between width of protrusion portion and groove width of main groove [%] | — | — | 75 | 40 | 50 | 60 | 80 | 90 | 100 | 75 |
| Ratio between cross-sectional area of protrusion portion and cross-sectional area of main groove [%] | — | — | 10 | 10 | 10 | 10 | 10 | 10 | 10 | 2 |
| Ratio between cross-sectional area of main groove of Conventional Example 1 and cross-sectional area of main groove [%] | 100 | 90 | 100 | 100 | 100 | 100 | 100 | 100 | 100 | 100 |
| Figure showing shape of protrusion portion | — | — | FIG. 2 | FIG. 2 | FIG. 2 | FIG. 2 | FIG. 2 | FIG. 2 | FIG. 2 | FIG. 2 |
| Number of sipes (how many) | — | — | 2 | 2 | 2 | 2 | 2 | 2 | 2 | 2 |
| Depth Da/H of sipe* [%] | — | — | 100 | 100 | 100 | 100 | 100 | 100 | 100 | 100 |
| Noise performance [dB(A)] [Difference between from Conventional Example 1; Larger is better.] | — | 0.5 | 0.5 | 0.1 | 0.2 | 0.3 | 0.5 | 0.5 | 0.5 | 0.1 |
| Drainage performance [Index; Larger is better.] | 100 | 95 | 100 | 100 | 100 | 100 | 99 | 99 | 98 | 100 |

|  | Ex. 7 | Ex. 8 | Comparative Ex. 3 | Ex. 9 | Ex. 10 | Ex. 11 | Ex. 12 | Ex. 13 | Ex. 14 |
|---|---|---|---|---|---|---|---|---|---|
| Ratio W3/W1 between width of protrusion portion and groove width of main groove [%] | 75 | 75 | 75 | 75 | 75 | 75 | 75 | 75 | 75 |
| Ratio between cross-sectional area of protrusion portion and cross-sectional area of main groove [%] | 3 | 15 | 20 | 10 | 10 | 10 | 10 | 10 | 10 |
| Ratio between cross-sectional area of main groove of Conventional Example 1 and cross-sectional area of main groove [%] | 100 | 100 | 100 | 100 | 100 | 100 | 100 | 100 | 100 |
| Figure showing shape of protrusion portion | FIG. 2 | FIG. 2 | FIG. 2 | FIG. 5 | FIG. 6 | FIG. 2 | FIG. 2 | FIG. 2 | FIG. 2 |
| Number of sipes (how many) | 2 | 2 | 2 | 2 | 2 | 1 | — | 2 | 2 |
| Depth Da/H of sipe* [%] | 100 | 100 | 100 | 100 | 100 | 100 | — | 50 | 60 |
| Noise performance [dB(A)] [Difference between Conventional Example 1; Larger is better.] | 0.3 | 0.5 | 0.5 | 0.5 | 0.5 | 0.4 | 0.3 | 0.4 | 0.4 |
| Drainage performance [Index; Larger is better.] | 100 | 98 | 96 | 100 | 98 | 99 | 99 | 99 | 100 |

*H: A height from a virtual groove bottom of the protrusion portion at the position where the sipe 20 is provided.

From the results of the tests, the tires of Examples were significantly improved as compared with the tires of Conventional Examples and Comparative Examples. Moreover, in the tests of the tires having different widths of the sipes, the width of the sipes having a range of from 0.6 to 0.8 mm brought good results.

DESCRIPTION OF THE REFERENCE

2 Tread portion
3 Main groove
3G Groove center line of main groove

10 First groove wall
10i Inner end of first groove wall
11 Second groove wall
11i Inner end of second groove wall
12 Groove bottom
12A Virtual groove bottom
13 Protrusion portion

The invention claimed is:

1. A pneumatic tire provided with a tread portion with at least one main groove extending continuously in the tire circumferential direction, wherein
the main groove, in a cross-section perpendicular to a groove center line, comprises
a first groove wall consisting of a first portion and a second portion both extending radially inward from a tread surface, said first portion inclined at an angle α1 with respect to a normal line of the tread surface and said second portion inclined at a larger angle α2 than the first portion gradually increasing in an arc-like fashion toward the groove center line,
a second groove wall consisting of a first portion and a second portion both extending radially inward from the other of the tread surfaces, said first portion inclined at an angle and second portion inclined at a larger angle than the first portion gradually increasing in an arc-like fashion toward the groove center line,
wherein the incline angles of the first portion and second portion of the first groove wall and second groove wall are such that a width of the main groove is at a maximum at the tread surface and a minimum at a groove bottom, and
the groove bottom connecting a radially inner end of the first groove wall and a radially inner end of the second groove wall and including a protrusion portion convexed toward the radially outside;
the protrusion portion continues along the main groove, and, in the axial direction of the tire, the width of the top portion of the protrusion portion is in a range of from 50% to 100% of the maximum groove width of the main groove; and
a cross-sectional area of the protrusion portion outwardly protruding in the tire radial direction from a virtual groove bottom connecting the inner end of the first groove wall and the inner end of the second groove wall with a straight line is in a range of from 3% to 15% of a groove cross-sectional area of the main groove,
wherein the pneumatic tire is provided in the protrusion portion with a first sipe extending along the groove center line of the main groove;
wherein a depth of the first sipe is in a range of from 50% to 100% of a radial height from the virtual groove bottom of the protrusion portion at the position provided with the first sipe.

2. The pneumatic tire according to claim 1, wherein a radially outmost top of the protrusion portion is positioned on the groove center line of the main groove.

3. The pneumatic tire according to claim 1, wherein the main groove extends linearly in the tire circumferential direction.

4. The pneumatic tire according to claim 1, wherein the protrusion portion further comprises a second sipe.

5. The pneumatic tire according to claim 4, wherein the second sipe is disposed at an equal pitch across the groove center line from the first sipe.

6. The pneumatic tire according to claim 4, wherein a pitch P between the first sipe and the second sipe is in a range of from 1.0 to 3.0 mm.

7. The pneumatic tire according to claim 4, wherein the first sipe and second sipe are provided on both sides of the radially outermost top of the protrusion portion.

8. A pneumatic tire provided with a tread portion with at least one main groove extending continuously in the tire circumferential direction and having a main groove width on the radially outer side of the main groove larger than the groove width on the radially inner side of the main groove, wherein
the main groove, in a cross-section perpendicular to a groove center line, comprises
a first groove wall extending radially inward from one of tread surfaces,
a second groove wall extending radially inward from the other of the tread surfaces, and
a groove bottom connecting a radially inner end of the first groove wall and a radially inner end of the second groove wall and including a protrusion portion convexed toward the radially outside;
the protrusion portion continues along the main groove, and, in the axial direction of the tire, the width of the top portion of the protrusion portion is in a range of from 50% to 100% of the maximum groove width of the main groove; and
a cross-sectional area of the protrusion portion outwardly protruding in the tire radial direction from a virtual groove bottom connecting the inner end of the first groove wall and the inner end of the second groove wall with a straight line is in a range of from 3% to 15% of a groove cross-sectional area of the main groove,
wherein the pneumatic tire is provided in the protrusion portion with a first sipe extending along the groove center line of the main groove;
wherein a depth of the first sipe is in a range of from 50% to 100% of a radial height from the virtual groove bottom of the protrusion portion at the position provided with the first sipe.

9. The pneumatic tire according to claim 1, wherein the width of the sipe is in a range from 0.6 to 0.8 mm.

10. The pneumatic tire according to claim 8, wherein the width of the sipe is in a range from 0.6 to 0.8 mm.

11. The pneumatic tire according to claim 3, wherein a radially outmost top of the protrusion portion is positioned on the groove center line of the main groove.

12. The pneumatic tire according to claim 4, wherein a radially outmost top of the protrusion portion is positioned on the groove center line of the main groove.

13. The pneumatic tire according to claim 6, wherein the second sipe is disposed at an equal pitch across the groove center line from the first sipe.

14. The pneumatic tire according to claim 7, wherein the second sipe is disposed at an equal pitch across the groove center line from the first sipe.

15. The pneumatic tire according to claim 7, wherein a pitch P between the first sipe and the second sipe is in a range of from 1.0 to 3.0 mm.

16. The pneumatic tire according to claim 1, wherein a main groove width on the radially outer side of the main groove is larger than the groove width on the radially inner side of the main groove.

* * * * *